(12) United States Patent
Kress et al.

(10) Patent No.: US 7,427,842 B2
(45) Date of Patent: Sep. 23, 2008

(54) SERIES MOTOR AND METHOD OF CONTROLLING THE SAME

(75) Inventors: Christof Kress, Deizisau (DE); Martin Beichter, Stuttgart (DE)

(73) Assignee: C. & E. Fein GmbH (DE)

(*) Notice: Subject to any disclaimer, the term of this patent is extended or adjusted under 35 U.S.C. 154(b) by 0 days.

(21) Appl. No.: 11/549,455

(22) Filed: Oct. 13, 2006

(65) Prior Publication Data

US 2007/0090780 A1    Apr. 26, 2007

Related U.S. Application Data

(63) Continuation of application No. PCT/EP2005/003237, filed on Mar. 26, 2005.

(30) Foreign Application Priority Data

Apr. 13, 2004    (DE) .................. 10 2004 018 966

(51) Int. Cl.
*H02P 7/00* (2006.01)
(52) U.S. Cl. .............. 318/432; 318/474; 388/907.5; 388/937; 173/7
(58) Field of Classification Search .......... 318/432, 318/434, 474; 388/937, 907.5; 173/7
See application file for complete search history.

(56) References Cited

U.S. PATENT DOCUMENTS 5,563,482 A * 10/1996 Shaw et al. .................. 318/272
5,754,019 A * 5/1998 Walz .......................... 318/434
6,104,155 A * 8/2000 Rosa .......................... 318/381
6,236,177 B1 5/2001 Zick et al. ................... 318/362

FOREIGN PATENT DOCUMENTS

| AT | 36 099 | 11/1988 |
|---|---|---|
| DE | 31 19 794 A1 | 12/1982 |
| DE | 34 32 845 A1 | 3/1986 |
| DE | 689 08 799 | 1/1990 |
| DE | 38 33 701 A1 | 4/1990 |
| DE | 39 24 653 A1 | 1/1991 |
| DE | 40 21 559 C1 | 12/1991 |
| DE | 693 10 960 | 11/1997 |

* cited by examiner

*Primary Examiner*—Rina I Duda
(74) *Attorney, Agent, or Firm*—St. Onge Steward Johnston & Reens LLC

(57) ABSTRACT

A circuit for a series motor for a power tool is disclosed, wherein reliable switching is achieved by means of two electronic switches, without the use of a mechanically disconnecting switch. To this end, two electronic switches, preferably triacs, are preferably connected in series to each other, the voltage drop across the triacs being continuously monitored by a monitoring circuit. A check for faults can be carried out before switching on the power tool. Alternatively, a fusible cutout can be tripped by means of a protective switch connected in parallel thereto.

19 Claims, 3 Drawing Sheets

SERIES MOTOR AND METHOD OF CONTROLLING THE SAME

CROSSREFERENCES TO RELATED APPLICATIONS

This application is a continuation of International Patent Application PCT/EP2005/003237, filed on Mar. 26, 2005 designating the U.S., which International Patent Application has been published in German language and claims priority of German patent application 10 2004 018 966.8, filed on Apr. 13, 2004 the entire contents of which is incorporated herein by reference.

BACKGROUND OF THE INVENTION

The invention relates to a series motor comprising contactless switching elements for interrupting operation, said elements being embodied in the form of electronic switches.

Power tools are generally driven by electric motors that are configured as series motors (universal motors) and controlled by means of mechanical switches. Although electronics are becoming more and more widespread in power tools as well, controlling power tools solely by means of power semiconductors that also serve to switch the power tool on and off is considered to be insufficiently reliable. The reason for this is that semiconductors can break down (internal short circuit) and then can no longer be controlled. In the case of purely electronic switches having only a single switch path, what can occur is that a permanent connection is created between the voltage supply and the motor, i.e. that the motor can no longer be switched off, or immediately starts to turn.

In order to achieve sufficiently reliable control of power tools using only electronic switches and no mechanical switches, it is known in the prior art to arrange a protective switch parallel to the control switch with which the motor is switched on and off, said protective switch tripping a fuse if there is any malfunction of the control switch (cf. DE 3 119 794 C2, DE 3 432 845 A1, DE 4 021 559 C1).

However, circuits of this kind operate reliably only when erratic behavior on the part of the machine and the electronic switching element is detected and the appliance can be brought to a defined OFF state, and any defect in the protection circuit can also be detected in order to put the appliance into a defined OFF state.

In the prior art, only DE 3 119 794 C2 addresses the problem of a defect occurring in the protection circuit, but said invention requires the operator to test the protection circuit occasionally by pressing a pushbutton.

SUMMARY OF THE INVENTION

It is a first object of the present invention to disclose a series motor that can be switched on and off reliably using only electronic switches, despite dispensing with mechanical switching elements.

It is a second object of the present invention to disclose a method of controlling a series motor that enables switching on and off the motor reliably using only electronic switches, despite dispensing with mechanical switching elements.

It is a third object of the invention to disclose a power tool comprising a series motor that can be switched on and off reliably using only electronic switches, despite dispensing with mechanical switching elements.

It is a forth object of the invention to disclose a power tool allowing a safe testing of the controls thereof before switching on its motor.

These and other objects of the invention are achieved by a series motor, in particular for a power tool, comprising a first electronic switch (control switch) for switching the motor on and off, a second electronic switch (protective switch) connected in series to the control switch, a monitoring circuit that monitors the function of the switches and analyzes the voltage potential at the connection point of the control switch and the protective switch, and further comprising an electronic controller, preferably a microprocessor, that is coupled to the two switches and the monitoring circuit and forces at least one of the switches into a blocked state when the monitoring circuit registers a malfunction in one of the switches.

According to the invention, the motor can be switched on and off reliably even when one of the two switches malfunctions, by virtue of the fact that two electronic switches, one control switch and one protective switch, are connected in series. A monitoring circuit ensures that malfunctions of the control switch and/or the protective switch can be detected, and that the motor can be forced into a safe OFF state. This means that manual monitoring of the system is no longer required. Instead, a test for faults is automatically conducted when switching on the motor, and only on condition that no fault has been detected is switching on enabled.

In an advantageous development of the invention, a means is provided for bridging the switch path of the protective switch with a high impedance in order to allow a functional test of the control switch to be carried out without having to start the motor.

This prevents the motor from briefly starting up in the event that the protective switch is energized during the initial functional test, if the control switch has broken down. By means of this high-impedance bridge across the switch path of the protective switch, the latter can be safely tested without the risk arising of the motor starting up if the control switch is defective.

The means for high-impedance bridging across the switch path of the protective switch can comprise an optocoupler, for example, which preferably includes an optotriac, and which is connected in parallel to the main terminals of the protective switch via a resistor.

Another way of preventing the motor from briefly starting up if the control switch is defective when the protective switch is being tested is to provide a means for monitoring the rotation of the motor, said means being coupled to the controller in order to force at least one of the two switches into a blocked state in the event that the motor starts when the protective switch is energized without the control switch being energized.

This likewise avoids the risk of the motor briefly starting up if the control switch malfunctions while the protective switch is being tested.

The means for monitoring the rotation of the motor can be embodied in the form of a rotational speed sensor, or it can monitor the motor current. In the latter case, a shunt resistor is connected in series to the armature, and the voltage drop across the resistor is monitored.

There are various options for configuring the monitoring circuit to monitor the voltage potential across the control switch.

Whereas a circuit comprising a transistor, a diode and two resistors is known from the prior art, for example U.S. Pat. No. 6,236,177 B1, the invention prefers a much simpler circuit.

In a preferred development of the invention, the monitoring circuit includes a voltage divider with two resistors connected in series, the first resistor being connected to a first pole of an auxiliary voltage supply and the second resistor being connected to one of the main terminals of the control switch and to the second pole of the auxiliary voltage, the connection point between the two resistors being connected via a third resistor to the other main terminal of the control switch and supplied as the output of the monitoring circuit to an input terminal of the controller.

Reliable monitoring can thus be achieved using only three resistors and the supply voltage, which is required anyway for the electronics.

According to an alternative embodiment of the invention, the object is achieved by means of a series motor, in particular for an power tool, comprising a fuse via which the armature is connected via a first electronic switch (control switch) to the supply voltage in order to switch the motor on and off, a second electronic switch (protective switch) connected in parallel to the armature and to the control switch in order to trip the fuse in the event of a fault, an electronic controller, preferably a microprocessor, coupled to the switches, a means for blocking the protective switch and for testing the function of the protective switch in the blocked state, and a monitoring circuit that analyzes the voltage drop at the control switch and whose output signal is supplied to the electronic controller to force the protective switch to trip the fuse if the monitoring circuit registers a malfunction of the control switch.

In this manner, too, the technical problem of the invention is completely solved.

Whereas it was not possible in the prior art to test the function of the protective switch in the event of a fault, given a parallel arrangement of the protective switch for tripping the fuse, according to the present invention the protective switch is now initially blocked and can then be safely tested without tripping the fuse.

To this end, in a preferred development of the invention, a transistor having an emitter and collector and which can be made conductive in order to test the protective switch by measuring its control current is connected between the control terminal and a main terminal of the protective switch in order to prevent the fuse from tripping when the protective switch is being tested.

According to another advantageous embodiment of the invention, the electronic switches are embodied as triacs.

This has the advantage that high loads can therefore be switched largely without power loss, even with alternating current, and simultaneously that the control switch can also be used to regulate the power and control the speed of the motor.

With regard to method, the object of the invention is further achieved with a method for controlling a series motor, preferably a series motor for a power tool, and comprising the following steps:
(a) connecting the motor to a supply voltage via a first electronic switch (control switch) for switching the motor on and off, and a second electronic switch (protective switch),
(b) monitoring the voltage potential across the control switch,
(c) blocking the switches if the voltage potential across the control switch takes on values outside a predefined threshold range when both switches are in the switched-off state,
(d) first switching on the protective switch if the voltage potential across the control switch is within the threshold range when both switches are in the switched-off state,
(e) switching on the control switch if the voltage potential across the control switch takes on values outside the threshold range and
(f) blocking both switches if the voltage potential across the control switch does not take on values outside the threshold range.

According to the invention, a functional test is firstly performed before the control switch is switched on, in order to determine whether the protective switch is working properly. If this is the case, the control switch is subsequently tested before it can be switched on to make the motor operational.

Faults in the protective switch and/or the control switch can be reliably detected in this way. Disconnecting the protective switch or the control switch does not pose a risk, because the motor is unable to start in such a case. Due to the fact that, during the tests, opposite input signals are required at the input terminals of the electronic controller for determining whether the control switch and the protective switch are working correctly, any short circuit or disconnection of discrete parts of the monitoring circuit will result in a safe OFF state. Faults in the driver circuits are also detected. This is because permanent energization produces the same faults as a short circuited control switch or protective switch. If there is no energization, this leads to the same behavior as when the control switch or protective switch is disconnected. In such a case, it is not possible for the motor to start.

In one advantageous development of the invention, the protective switch is immediately switched off again if the voltage potential does not increase when switching on the protective switch with the control switch switched off.

In this case, there is a fault in the control switch. By switching off the protective switch immediately, the motor is prevented from starting.

To this end, according to a further development of the method of the invention, the rotation of the motor is monitored in order to switch off the motor again immediately if any rotation of the motor is registered when switching on the protective switch with the control switch switched off.

In an alternative embodiment, the protective switch can firstly be bridged by a high impedance in order to test the control switch, and a test carried out to determine whether the voltage potential across the control switch increases to the predefined threshold value.

In this way, the motor can be safely prevented from starting when the control switch is being tested, even if there is a defect.

Alternatively, the object of the invention is achieved with a method for controlling a series motor, preferably a series motor for a power tool, comprising the following steps:
(a) connecting the motor to a supply voltage via a fuse and a first electronic switch (control switch) for switching the motor on and off, and connecting a second electronic switch (protective switch) to the supply voltage via the fuse,
(b) before switching on the control switch, first blocking the protective switch and testing whether the protective switch works by energizing the protective switch and testing the control current,
(c) removing the block on the protective switch if energization of the protective switch is found to be working properly, and switching on the control switch in order to switch on the motor,
(d) blocking energization of the control switch if a malfunction is detected in the course of step (b),
(e) monitoring the voltage drop at the control switch and triggering the protective switch in order to trip the fuse if the voltage drop when switching off the control switch does not increase beyond a predefined threshold value.

In this way, by connecting the protective switch in parallel, it is possible to test for any malfunction in the driver circuit for the protective switch prior to switching on the control switch, and for deactivation to be effected should the control switch fail.

It is self-evident that the features of the invention as mentioned above and to be explained below can be applied not only in the combination specified in each case, but also in other combinations or in isolation, without departing from the scope of the invention.

BRIEF DESCRIPTION OF THE DRAWINGS

Further advantages and features of the invention derive from the following description of preferred embodiments, in which reference is made to the drawings, in which.

DESCRIPTION OF PREFERRED EMBODIMENTS

Figure 1:
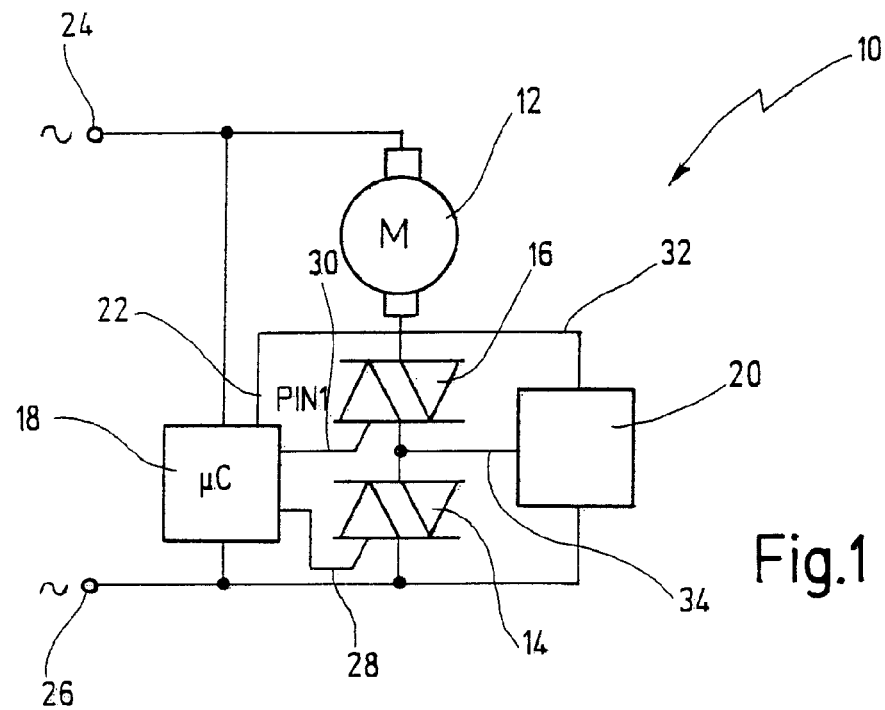
FIG. 1 shows, in a simplified circuit diagram, a first embodiment of a series motor according to the invention.

FIG. 1 shows an electric motor according to the invention, in the form of a series motor circuit and labeled in its entirety with reference numeral 10.

The motor 10 is supplied with 230 V from the two poles 24 and 26 of an alternating voltage source. Motor 10 has an armature 12, the field windings of which (not shown) are wound in series and connected to the one pole 24 of the supply voltage. The other pole of the armature 12 is connected to the other pole 26 of the supply voltage via two triacs in series, namely a protective switch 16 and a control switch 14. Control terminals 28 and 30 of control switch 14 and protective switch 16 are connected to the terminals of an electronic controller 18 in the form of a microprocessor. Electronic controller 18 is likewise connected to the two poles 24 and 26 of the supply voltage source, and is supplied in addition with a DC supply (unless this voltage supply is not already integrated in electronic controller 18). A monitoring circuit 20 is also connected between control switch 14 and protective switch 16, on the one hand, and the second pole 26 of the supply voltage source, on the other hand, wherein said monitoring circuit monitors the voltage potential between control switch 14 and protective switch 16, on the one hand, and the second pole 26 of the supply voltage source, on the other hand, and the output of which is coupled via a line 32 to an input terminal 22 (Pin 1) of electronic controller 18.

By phase control of control switch 14, electronic controller 18 also performs, in an essentially known manner, the functions of a soft starter when switching on the motor and those of a speed and/or power control during motor operation.

By means of monitoring circuit 20, it is now possible to perform a functional check before switching on electric motor 10, in order to ensure that both control switch 14 and protective switch 16 are working faultlessly.

Figure 2:
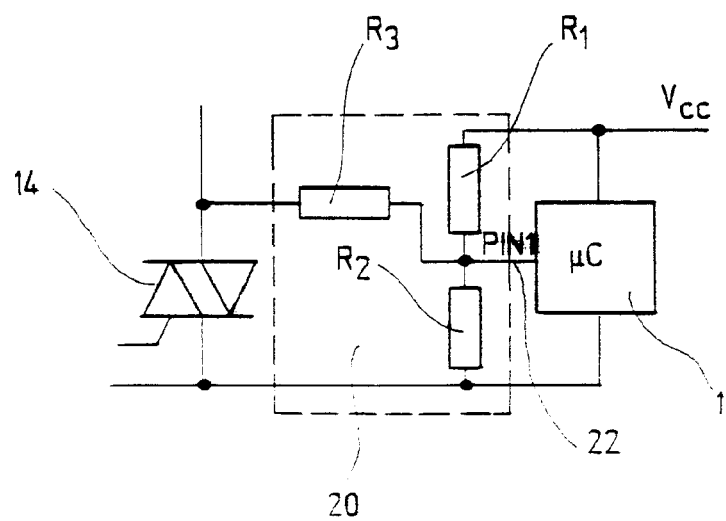
FIG. 2 shows a preferred embodiment of a monitoring circuit suitable for the motor of FIG. 1.

FIG. 2 shows a preferred embodiment of monitoring circuit 20. An auxiliary voltage, which may be the supply voltage $V_{cc}$ for the electronic controller 18, is supplied via a voltage divider to the one main terminal of control switch 14, which is connected to the second pole 26 of the AC source. The voltage divider consists of resistors $R_1$, and $R_2$. The tap of the voltage divider is connected to input terminal 22 (Pin 1) of controller 18. The tap of the voltage divider is also coupled via a third resistor $R_3$ to the point of connection between control switch 14 and protective switch 16.

Such a monitoring circuit provides a very simple way of monitoring the voltage potential across control switch 14 using only three components.

Figure 3:
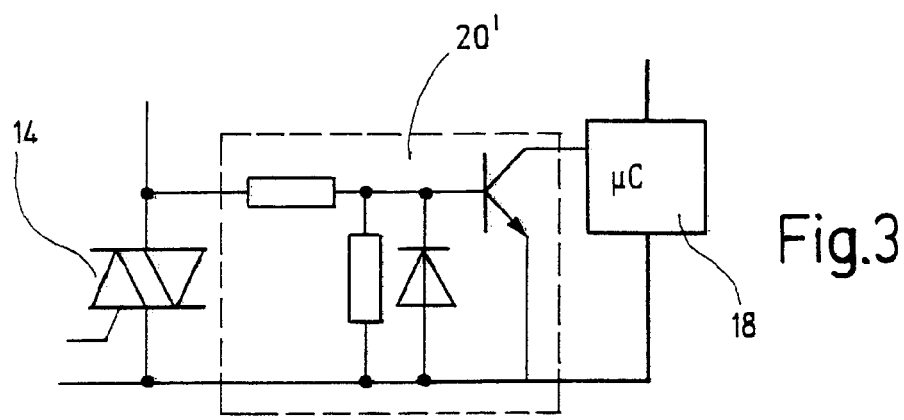
FIG. 3 shows an alternative embodiment of the monitoring circuit for the motor in FIG. 1.

In alternative embodiments of the invention it is also possible to use other monitoring circuits, such as the monitoring circuit known from U.S. Pat. No. 6,236,177 B1. Such a circuit is shown in FIG. 3, where it is labeled with the reference numeral 20'. However, a monitoring circuit as shown in FIG. 2 is preferred due to its simpler construction.

Figure 4:
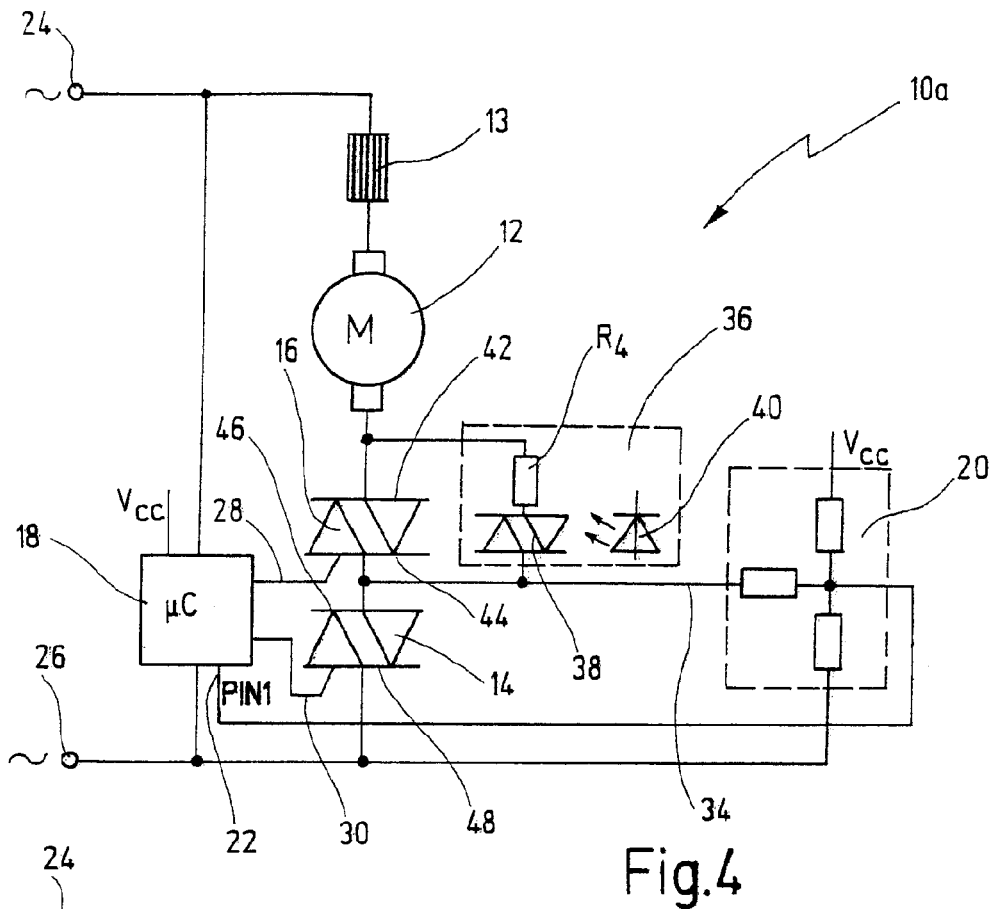
FIG. 4 shows a modified version of the circuit in FIG. 1.

A modified embodiment of the electric motor according to the invention is shown in FIG. 4, where it Is referenced in its entirety with numeral 10a. In this and in further modifications to be explained later, corresponding reference numerals are used for corresponding parts.

The only difference between the circuit of electric motor 10a and the embodiment of electric motor 10 in FIG. 1 is that a means 36 for high-impedance bridging of protective switch 16 is additionally provided. Said means 36 for high-impedance bridging of protective switch 16 consists of an optotriac 38 which is connected in parallel to the main terminals of protective switch 16 via a resistor $R_4$. Optotriac 38 is energized by an LED 40.

FIG. 4 also indicates one of the two field windings, labeled with reference numeral 13, that are in series with armature 12.

The manner of operation of series motor 10 or 10a shall now be described

In the circuit shown in FIGS. 1 and 2, an initial test is firstly conducted, before electric motor 10 is first switched on, to determine whether the output voltage of monitoring circuit 20, which is fed to input terminal 22 (Pin 1) of microprocessor 18 via line 32, is inside the predefined threshold range. This can be seen in greater detail in FIG. 2a. While supply voltage $V_{CC}$ is applied across $R_1$ and the potential across $R_2$ is zero, the AC voltage at the point of connection between control switch 14 and protective switch 16 is supplied via $R_3$ to PIN 1. When control switch 14 and protective switch 16 are in the switched-off state, no alternating voltage is allowed across $R_3$, with the result that the voltage at PIN 1 depends exclusively on voltage divider $R_1$ and $R_2$, and on $V_{CC}$. For example, if $V_{CC}$ =5V and R1=R2, there is a threshold range of 2.5V±0.5V within which the voltage at PIN 1 must lie if control switch 14 and protective switch 16 are not being driven.

If this is the case, this first test has been passed. This test ensures that the blocking effect is tested for both the positive half-wave and the negative half-wave.

Otherwise there is a fault in the circuit. Either protective switch 16 is defective, i.e. is short-circuited, or the driver circuit for protective switch 16 is defective, or monitoring circuit 20 is defective. In this case, control switch 14 is not energized and microprocessor 18 changes over to a safe fault state (OFF state).

Figure 2A:
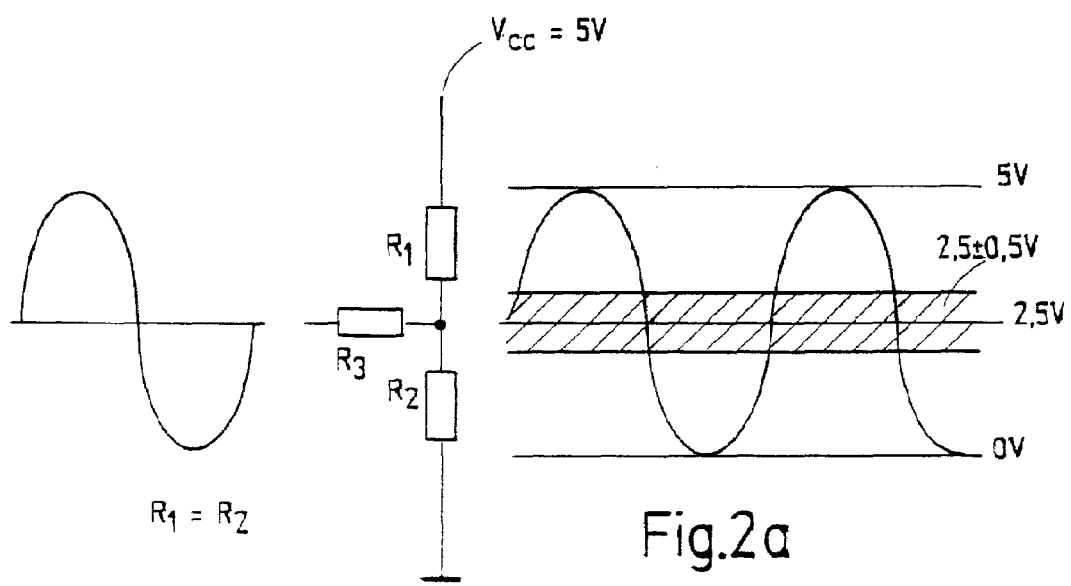
FIG. 2a shows a graph of the input voltage across resistor $R_3$ of the monitoring circuit in FIG. 2, and the associated output voltage at PIN 1.

If the first test is passed, then protective switch 16 is energized via line 30 when switching on, as shown in FIG. 1. In this case, if the voltage at Pin 1 oscillates such that the threshold limits shown in FIG. 2a are exceeded, then the circuit is functioning properly. If not, it is malfunctioning. Either there is a defect in control switch 14 (short circuit), or the driver circuit for the control switch 14 is defective, or monitoring circuit 20 is defective.

In there is a defect, protective switch 16 is switched off again as fast as possible and microprocessor 18 changes over to a safe fault state (OFF state).

If a defect (short circuit) in either control switch 14 or protective switch 16 is detected, the motor cannot be switched on. If control switch 14 or protective switch 16 is disconnected, it is likewise not possible for the motor to start, so this does not pose a risk. By means of the circuit for motor 10 as described above, faults in the monitoring circuit as well as faults in the driver circuits can be detected. Due to the fact that, during the tests, opposite input signals are required at input terminal 22 (Pin 1) of microprocessor 18 for the "Passed" function, any short circuit or disconnection of discrete parts of the monitoring circuit will result in a safe OFF state. Permanent energization either of control switch 14 or protective switch 16 leads to the same fault as short-circuiting the control switch or the protective switch. If microprocessor 18 fails to output a control signal on line 28 and line 30 to energize control switch 14 and protective switch 16, then this produces the same result as disconnecting control switch 14 or protective switch 16. It is not possible to start the motor in this case, either.

In the circuits according to FIG. 1, it is essential that protective switch 16 be switched off again immediately if a malfunction is detected during the second test, when protective switch 16 is energized while control switch 14 is not energized. If there is any delay in switching off protective switch 16 on detection of a fault during the second test, this may result in the motor being started, which could be disadvantageous in certain circumstances.

To eliminate this possibility, motor 10a in FIG. 4 is also provided with means 36 for high-impedance bridging of protective switch 16.

When test 1 has been completed (voltage at Pin 1 is within the threshold range when the protective switch and the monitoring circuit are not energized), protective switch 16 is merely bridged with a high impedance with the aid of circuit 36, instead of being energized. It is possible in this way to perform a functional test of control switch 16 without any risk arising of the motor immediately starting up if control switch 16 is short circuited.

Figure 5:
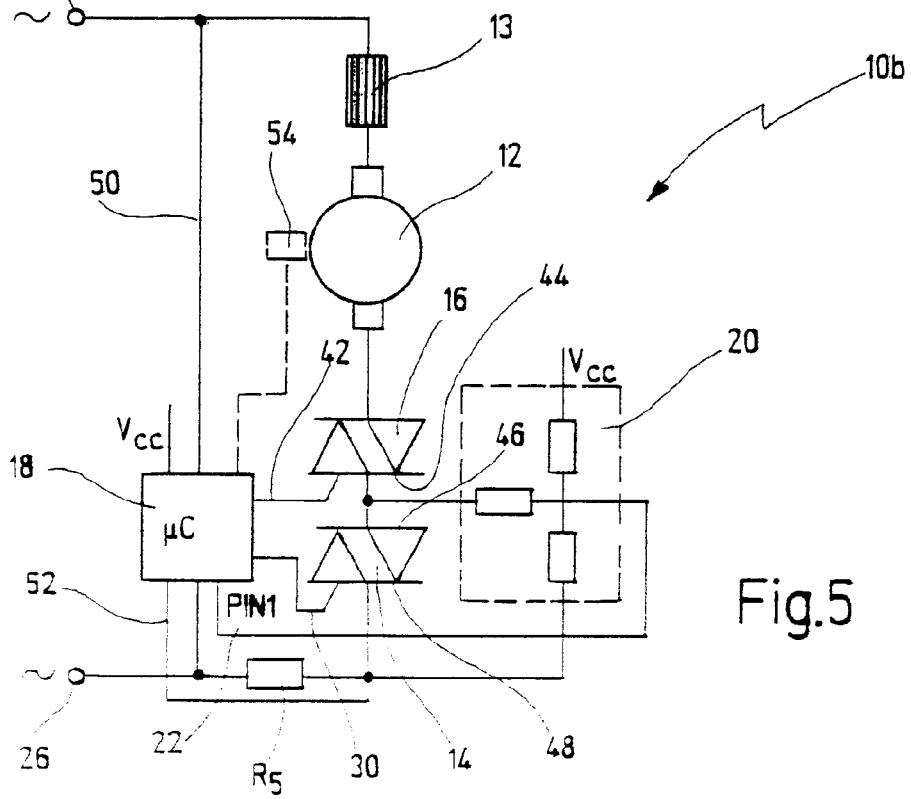
FIG. 5 shows a further modification of the circuit in FIGS. 1.

As an alternative to circuit 36 for high-impedance bridging of control switch 16, a means for monitoring the speed of rotation of the motor is shown as a further modification in FIG. 5, where it is labeled in its entirety with reference numeral 10b.

To this end, a shunt resistor Rs can be provided in series with field windings 13. If, during the second test, i.e. when switching on protective switch 16 in order to check control switch 14, a voltage drop across shunt resistor $R_5$ between pole 26 of the alternating voltage and line 52 is registered, energization of protective switch 16 is immediately interrupted to prevent the motor from starting up.

Alternatively (or additionally), a rotational speed sensor 54 that monitors the rotor speed of the motor could be provided, as indicated by the broken line in FIG. 5. If rotational speed sensor 54 receives a signal during test 2, i.e. when protective switch 16 is energized in order to check control switch 14, then energization of protective switch 16 is immediately interrupted to stop the electric motor from running. The circuit of motor 10b is otherwise identical to the circuit of motor 10a.

Figure 6:
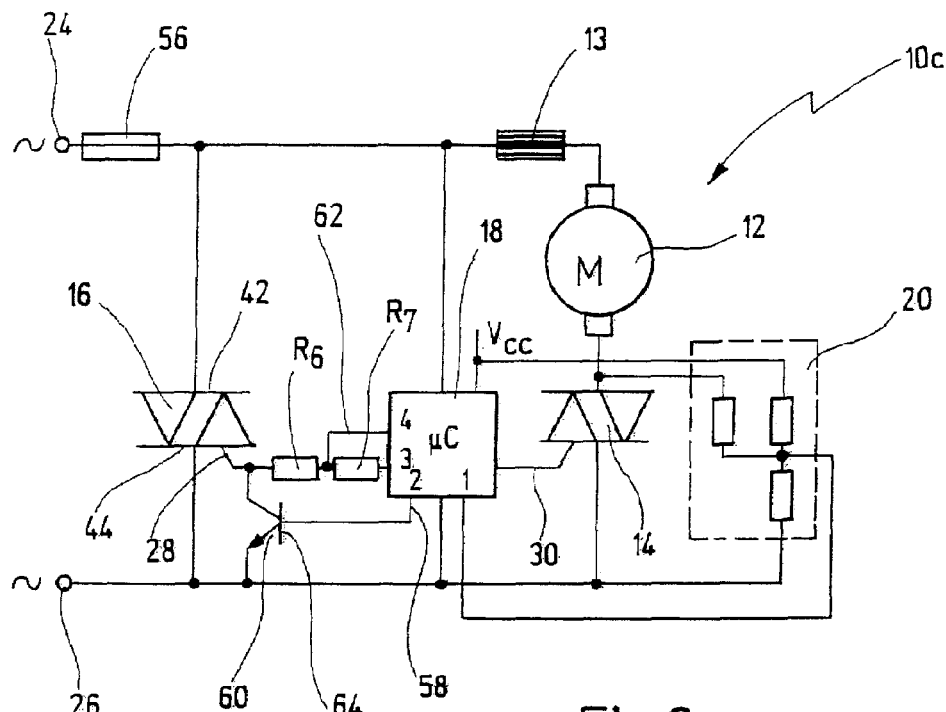
FIG. 6 shows another embodiment of the invention, comprising a parallel protective switch for tripping a fuse.

Another embodiment of an electric motor according to the invention is shown in FIG. 6, where it is referenced in its entirety with numeral 10c.

In this case, a fusible cutout 56 is provided that can be tripped by a protective switch 16 in the event of a fault in control switch 14. For this purpose, protective switch 16 is connected in parallel, immediately behind fuse 56, to the two poles 24 and 26 of the supply voltage source. The drop in voltage potential across control switch 14 is monitored, in turn, by a protection circuit 20, as explained above. The output from monitoring circuit 20 is supplied, in turn, to Pin 1 of microprocessor 18. Although a complete functional test is not possible with the circuit in FIG. 6, because fuse 56 would immediately respond, the driver circuit for protective switch 16 can nevertheless be tested by preventing the protective switch or triac 16 from triggering.

To this end, the gate 28 of triac 16 is connected via two series resistors $R_6$ and $R_7$ to an output terminal (Pin 3) of microprocessor 18. The point of connection between the two resistors $R_6$, $R_7$ is connected via a line 62 to a measurement input (Pin 4) of microprocessor 18. A transistor 60, the base of which can be driven via an output terminal (Pin 2) of microprocessor 18, is disposed between the gate 28 of protective switch 16 and pole 26 of the supply voltage.

For testing purposes, the monitoring circuit 20 is firstly assessed. The test is performed in the manner as described in conjunction with FIGS. 2 and 2a. If a fault is detected during said test, protective switch 16 is triggered in order to trip fuse 56.

It no fault is detected in the prior test, the driver circuit for protective switch 16 is then tested in the following manner:

In a first step, transistor 60 is powered at its base 64 via Pin 2 of microprocessor 18. This prevents triac 16 from triggering. Gating pulses are now outputted via Pin 3, whereby transistor 60 prevents any triggering. The voltage between resistors $R_6$, $R_7$ can now be detected at Pin 4 of microprocessor 18. The output voltage at Pin 3 corresponds approximately to the supply voltage $V_{CC}$. If no voltage is now applied at Pin 4, then either resistors $R_6$, $R_7$ have been disconnected or no gating pulse is outputted, which means that a fault is present. Assuming that resistors $R_6$, $R_7$ are identical, approximately half the supply voltage $\frac{1}{2} V_{CC}$ must be applied to Pin 4 while the gate trigger current is flowing. In this case, the driver circuit for triac 16 is working properly. If the full supply voltage $V_{CC}$ is applied to Pin 4 when gating pulses are being outputted at Pin 3, then resistor $R_6$ is disconnected, which again means there is a fault.

If no fault is detected, powering of transistor 60 via Pin 2 is cancelled in order that the protective switch or triac 16 can work during operation to enable control switch 14 to trip fuse 56 in the event of a fault. Control switch 14 can then be switched on in order to switch on the motor. If control switch 14 is not longer energized, i.e. no gating pulses are being outputted via line 30, then the voltage drop across control switch 14 must rise above a predefined threshold value. Otherwise, control switch 14 is defective. If a defect in control switch 14 is detected when switching it off, protective switch 16 is triggered via Pin 3 of control circuit 18 in order to trip fuse 56.

What is claimed is:

1. A series motor comprising:
    a first electronic switch configured as a control switch for switching the motor on and off;
    a second electronic switch configured as a protective switch connected in series to said control switch;
    a monitoring circuit for monitoring the function of the switches and analyzing a voltage potential at a connection point of said control switch and said protective switch;
    an electronic controller being coupled to said control switch and said protective switch and said monitoring circuit and forcing at least one of said switches into an OFF state when said monitoring circuit registers a malfunction in one of said switches; and a high-impedance bridging circuit for bridging a switch path of said protective switch with a high impedance in order to allow a functional test of the control switch without having to start the motor.

2. The series motor of claim 1, wherein said high-impedance bridging circuit comprises an optocoupler being connected in parallel via a resistor to main terminals of said protective switch.

3. The series motor of claim 1, further comprising a sensor for monitoring rotation of said motor, said sensor being coupled to said controller in order to force at least one of said switches into an OFF state in the event that said motor starts when said protective switch is energized without said control switch being energized.

4. The series motor of claim 3, wherein said sensor for monitoring rotation of said motor is configured as a rotational speed sensor.

5. The series motor of claim 3, wherein said sensor for monitoring the rotation of the motor monitors a current flowing through said motor.

6. The series motor of claim 5, wherein said sensor for monitoring the rotation of said motor is a shunt resistor that is connected in series to said armature and whose voltage drop is monitored.

7. The series motor of claim 1, wherein said switches are configured as triacs.

8. The series motor of claim 1, further comprising a sensor for monitoring rotation of said motor, said sensor being coupled to said controller in order to force at least one of said switches into an OFF state in the event that said motor starts when said protective switch is energized without said control switch being energized.

9. The series motor of claim 8, wherein said high-impedance bridging circuit comprises an optocoupler being connected in parallel via a resistor to main terminals of said protective switch.

10. The series motor of claim 8, wherein said monitoring circuit comprises a voltage divider having two resistors connected in series, the first resistor being connected to a first pole of an auxiliary voltage supply and the second resistor being connected to a first one of two main terminals of said control switch and to a second pole of said auxiliary voltage, a connection point between said two resistors being connected via a third resistor to a second one of said two main terminals of said control switch and being supplied as an output of said monitoring circuit to an input terminal of said controller.

11. A series motor comprising:
a first electronic switch configured as a control switch for switching the motor on and off;
a second electronic switch conficiured as a protective switch connected in series to said control switch;
a monitoring circuit for monitoring the function of the switches and analyzing a voltage potential at a connection point of said control switch and said protective switch;
an electronic controller being coupled to said control switch and said protective switch and said monitoring circuit and forcing at least one of said switches into an OFF state when said monitoring circuit registers a malfunction in one of said switches; and
wherein said monitoring circuit comprises a voltage divider having two resistors connected in series, the first resistor being connected to a first pole of an auxiliary voltage supply and the second resistor being connected to a first one of two main terminals of said control switch and to a second pole of said auxiliary voltage, a connection point between said two resistors being connected via a third resistor to a second one of said two main terminals of said control switch and being supplied as an output of said monitoring circuit to an input terminal of said controller.

12. A series motor comprising:
an armature;
a first electronic switch configured as a control switch for switching said motor on and off;
a fuse connecting said armature via said first control switch to a supply voltage in order to switch said motor on or off;
a second electronic switch configured as a protective switch and being connected in parallel to said armature and to said control switch for tripping said fuse in the event of a fault;
an electronic controller being coupled to said switches;
a blocking circuit for blocking said protective switch and for testing a correct operation of said protective switch when being in a blocked state; and
a monitoring circuit being configured for analyzing a voltage drop across said control switch, said monitoring circuit generating an output signal that is supplied to said electronic controller for forcing said protective switch to trip the fuse if the monitoring circuit registers a malfunction of said control switch.

13. The series motor of claim 12, further comprising a transistor having an emitter, a collector and a base;
wherein said protective switch comprises a control terminal and a main terminal;
wherein said transistor is connected with its emitter and collector between said control terminal and said main terminal of said protective switch, and which transistor can be made conductive for preventing a tripping of said fuse when measuring a control current of said protective switch during testing thereof.

14. The series motor of claim 12, wherein said switches are configured as triacs.

15. A method of controlling a series motor, said method comprising the following steps:
(a) connecting said motor to a supply voltage by means of a first electronic switch being configured as a control switch for switching said motor on and off, and by means of a second electronic switch being configured as a protective switch;
(b) monitoring a voltage potential across said control switch;
(c) blocking said switches if the voltage potential across the control switch takes on a value outside a predefined threshold range when both switches are in a switched-off state;
(d) first switching on said protective switch if said voltage potential across the control switch is within the threshold range when both switches are in said switched-off state;
(e) switching on said control switch if said voltage potential across said control switch takes on a value outside said predefined threshold range; and
(f) blocking both switches if said voltage potential across said control switch does not take on a value above said predefined threshold range.

16. The method of claim 15, further comprising the step of switching off said protective switch immediately again if said voltage potential does not increase when switching on the protective switch with the control switch being switched off.

17. The method of claim 15, further comprising the step of monitoring rotation of said motor for switching off the motor again immediately if a rotation of the motor is registered when switching on the protective switch with the control switch being switched off.

18. The method of claim 15, wherein the protective switch is first bridged by a high impedance in order to test the control switch, and a test is carried out to determine whether the voltage potential across the control switch increases to the predefined threshold value.

19. The method of claim 15, wherein said first and second switches configured as triacs are used.

* * * * *